United States Patent [19]
Britton, Jr. et al.

[11] Patent Number: 5,986,272
[45] Date of Patent: Nov. 16, 1999

[54] REAL-TIME METHOD AND APPARATUS FOR MEASURING THE TEMPERATURE OF A FLUORESCING PHOSPHOR

[75] Inventors: Charles L. Britton, Jr., Alcoa; David L. Beshears; Marc L. Simpson, both of Knoxville; Michael R. Cates, Oak Ridge; Steve W. Allison, Knoxville, all of Tenn.

[73] Assignee: American Iron and Steel Institute, Washington, D.C.

[21] Appl. No.: 09/293,916

[22] Filed: Apr. 19, 1999

Related U.S. Application Data

[62] Division of application No. 08/966,657, Nov. 10, 1997.

[51] Int. Cl.[6] .................................................. G01K 11/00
[52] U.S. Cl. ..................................... 250/459.1; 250/484.4; 374/161; 374/159
[58] Field of Search ............................. 250/458.1, 459.1, 250/461.1, 473.1, 483.1, 484.4, 484.2; 374/159, 161

[56] References Cited

U.S. PATENT DOCUMENTS

| | | | |
|---|---|---|---|
| 4,049,970 | 9/1977 | Ford | 250/461.2 |
| 4,224,519 | 9/1980 | Gammage et al. | |
| 4,652,143 | 3/1987 | Wickersheim et al. | |
| 4,752,141 | 6/1988 | Sun et al. | |
| 4,776,827 | 10/1988 | Greaves | |
| 4,895,156 | 1/1990 | Schulze | |
| 5,107,445 | 4/1992 | Jensen et al. | |
| 5,232,285 | 8/1993 | Mannik | 374/131 |
| 5,255,980 | 10/1993 | Thomas et al. | 374/161 |
| 5,304,809 | 4/1994 | Wickersheim | 250/458.1 |
| 5,332,316 | 7/1994 | Kleinerman | 374/161 |
| 5,414,266 | 5/1995 | Sun | 250/459.1 |
| 5,600,147 | 2/1997 | Jensen | 250/458.1 |
| 5,690,430 | 11/1997 | Rudolph | 374/126 |
| 5,862,170 | 1/1999 | Britton, Jr. et al. | 374/183 |

FOREIGN PATENT DOCUMENTS

| | | |
|---|---|---|
| 675043 | 7/1952 | United Kingdom. |
| 2194633 | 3/1988 | United Kingdom. |
| WO98-20315 | 5/1998 | WIPO. |

OTHER PUBLICATIONS

Bruce W. Noel, et al., "Thermographic–Phosphor Temperature Measurements: Commercial And Defense–Related Applications," Instrum. Soc. Am. Paper No. 94–1003, 1994, pp. 271–288.

"A CMOS Integrated Circuit for Pulse–Shape Discrimination", S.S. Frank, et al., Proceedings of the 1995 IEEE Nuclear Science Symposium and Medical Imaging Conference, OART 1 (of 3), vol. 1, Oct. 21–28, 1995, pp. 207–301.

*Primary Examiner*—Constantine Hannaher
*Assistant Examiner*—Albert Gagliardi
*Attorney, Agent, or Firm*—Fitzpatrick, Cella, Harper & Scinto

[57] ABSTRACT

A method for determining the temperature of a fluorescing phosphor is provided, together with an apparatus for performing the method. The apparatus includes a photodetector for detecting light emitted by a phosphor irradiated with an excitation pulse and for converting the detected light into an electrical signal. The apparatus further includes a differentiator for differentiating the electrical signal and a zero-crossing discrimination circuit that outputs a pulse signal having a pulse width corresponding to the time period between the start of the excitation pulse and the time when the differentiated electrical signal reaches zero. The width of the output pulse signal is proportional to the decay-time constant of the phosphor.

15 Claims, 10 Drawing Sheets

REAL-TIME METHOD AND APPARATUS FOR MEASURING THE TEMPERATURE OF A FLUORESCING PHOSPHOR

This application is a divisional of application Ser. No. 08/966,657, filed Nov. 10, 1997, now allowed.

NOTICE OF GOVERNMENT INTEREST

The Government of the United States of America has rights in this invention pursuant to Cooperative Agreement No. DE-FC07-93ID13205 awarded by the U.S. Department of Energy.

FIELD OF THE INVENTION

The present invention relates to a method and apparatus for measuring the decay-time constant of a fluorescing phosphor. In particular, it relates to a method and apparatus in which the decay-time constant of a fluorescing phosphor is measured and used to determine the temperature of the phosphor.

BACKGROUND OF THE INVENTION

A known method for measuring phosphor temperatures is based on the principle that certain phosphors fluoresce (i.e., emit light) when irradiated with ultraviolet light, and the characteristics of the emitted light vary with temperature. For example, if the phosphor is irradiated with a pulsed light source, the amplitude of emitted light following an excitation pulse diminishes with a decay-time constant that varies with temperature. To determine the surface temperature of an object utilizing this principle, a phosphor is deposited on the object, the phosphor is allowed to come to at least approximately the same temperature as the surface of the object, and the phosphor is then irradiated. The emitted light is detected and the decay-time constant is determined from the detected light. By comparing the measured decay-time constant to tabulated data giving the decay-time constant of the phosphor at various temperatures, the surface temperature of the object is determined, at least approximately. A general discussion of temperature measurements using fluorescing phosphors (also called thermographic phosphors) is contained in the article "Thermographic-Phosphor Temperature Measurements: Commercial And Defense-Related Applications" by Bruce W. Noel, et al., Instrum. Soc. Am. Paper No. 94–1003, 1994.

Conventional methods for determining the decay-time constant from detected light are generally complicated and require expensive circuits. One method, as described in U.S. Pat. No. 5,107,445, for example, uses digital processing techniques. The detected light from a fluorescing phosphor is converted to digital data and then curve-fitting techniques are used to determine the decay-time constant. Another method, as described in U.S. Pat. Nos. 4,752,141 and 4,652,143, for example, measures the time it takes for the amplitude of emitted light to decrease by a predetermined proportion. In this method, the signal level of emitted light is detected at a predetermined time interval after the excitation pulse to establish a baseline level. A counter is started when the baseline level is established. The baseline level is divided by the natural logarithmic base (e) to calculate a target signal level. When the level of emitted light falls to the target signal level, the counter is stopped. The time taken for the emitted light to decrease from the baseline level to 1/e times the baseline level, as indicated by the counter, is proportional to the decay-time constant.

These conventional techniques provide an exact value for the decay-time constant. However, these techniques require acquisition of data at multiple signal points and mathematical processing of data to perform curve-fitting or to calculate a target signal level. The circuits required for acquisition of the data and processing of the acquired data are expensive. Also, the process of acquiring and processing the data is time-consuming. Thus, although the conventional techniques provide accurate results, they are costly and do not provide results in real time.

SUMMARY OF THE INVENTION

An object of the present invention is to provide a simple, inexpensive method and apparatus for determining the decay-time constant of a fluorescing phosphor. It is a further object of the present invention to provide a method and apparatus that can determine the decay-time constant in real time and can be used to provide real-time temperature measurements.

Still another object of the present invention is to provide a method and apparatus for making real-time measurements of the surface temperature of a piece of metal, glass, ceramic, etc., which can be used to obtain temperature data useful for analysis and/or control of the process variables in a manufacturing process, such as a process for manufacturing steel, steel products (like galvannealed steel), aluminum, ceramic, or glass, for example.

According to a first aspect of the present invention, a method is provided which includes detecting light emitted by a phosphor in response to irradiation of the phosphor with an excitation pulse, and converting the detected light into an electrical signal. The method further includes differentiating the electrical signal, discriminating the zero-crossing point of the differentiated electrical signal, and outputting a pulse signal having a pulse width corresponding to the time period between the start of the excitation pulse and the time when the differentiated electrical signal reaches zero. The pulse width will be proportional to the decay-time constant of the phosphor.

According to another aspect of the present invention, an apparatus for determining the decay-time constant of a fluorescing phosphor is provided which includes a photodetector for detecting light emitted by a phosphor irradiated with an excitation pulse and for converting the detected light into an electrical signal. The apparatus further includes a differentiator for differentiating the electrical signal and a zero-crossing discrimination circuit that outputs a pulse signal having a pulse width corresponding to the time period between the start of the excitation pulse and the time when the differentiated electrical signal reaches zero. The width of the output pulse signal is proportional to the decay-time constant of the phosphor.

According to yet another aspect of the present invention, an apparatus and method are provided in which the decay-time constant of a phosphor is determined as discussed above and then used to determine the temperature of a phosphor or a piece of metal on which the phosphor is deposited. According to this aspect of the invention, the pulse signal output by the zero-crossing discrimination circuit is input to a temperature determination circuit which outputs a signal indicating the temperature. The temperature determination circuit may include an integrator which is calibrated so that the output of the integrator corresponds to the temperature of the phosphor. Alternatively, the temperature determination circuit may include a counter and a look-up table in a ROM. The pulse signal output by the zero-crossing discrimination circuit is used to control the starting and stopping of the counter, to generate a count value corresponding to the pulse width. The count value of the counter is input to the look-up table, which outputs a value corresponding to the temperature of the phosphor.

By these arrangements, the present invention provides a simple and relatively inexpensive method and apparatus for real-time measurement of a phosphor's decay-time constant and temperature. Further, the present invention provides a method and apparatus for real-time measurement of metal temperatures, which can be used for analysis and/or control of process variables in an aluminum or steel manufacturing process, or a similar process.

DESCRIPTION OF THE PREFERRED EMBODIMENTS

Figure 1:
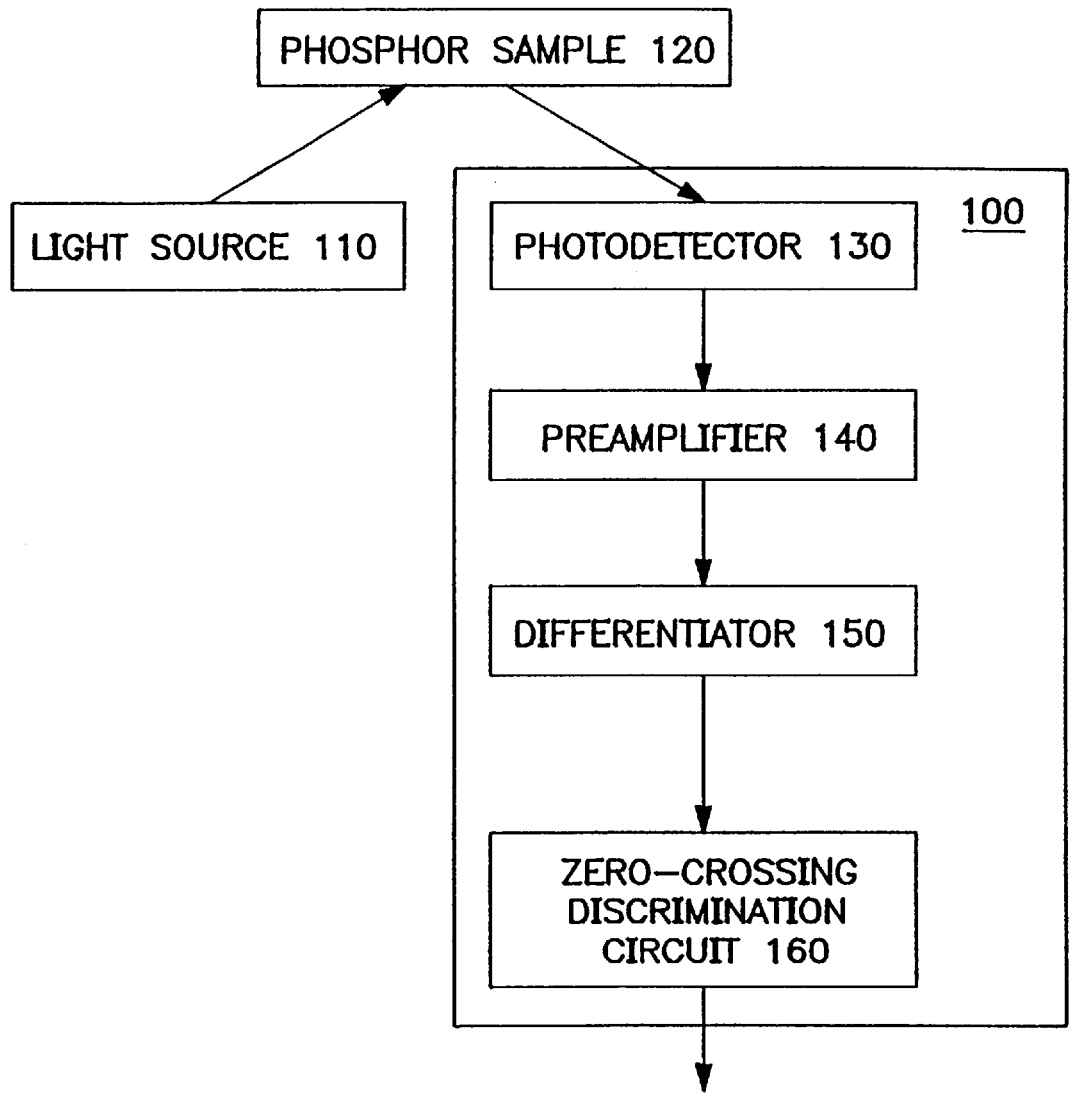
FIG. 1 is a block diagram of a circuit for determining the decay-time constant of a phosphor according to one embodiment of the present invention.

A first embodiment of the present invention will be described with respect to FIGS. 1 through 4. FIG. 1 shows a block diagram of a circuit 100 for determining the decay-time constant of a phosphor according to the present invention. As shown in FIG. 1, a light source 110 irradiates a phosphor sample 120. A preferred embodiment uses a nitrogen laser at a wavelength of 337 nm as the light source 110 and yttrium vanadate doped with europium ($YVO_4$:Eu) as the phosphor sample 120. The light source 110 can be a laser, an ultraviolet lamp, or any other light source capable of generating pulses of light at a wavelength appropriate to excite the phosphor to fluoresce. The width of the excitation pulse should be on the order of a few nanoseconds.

Figure 2:
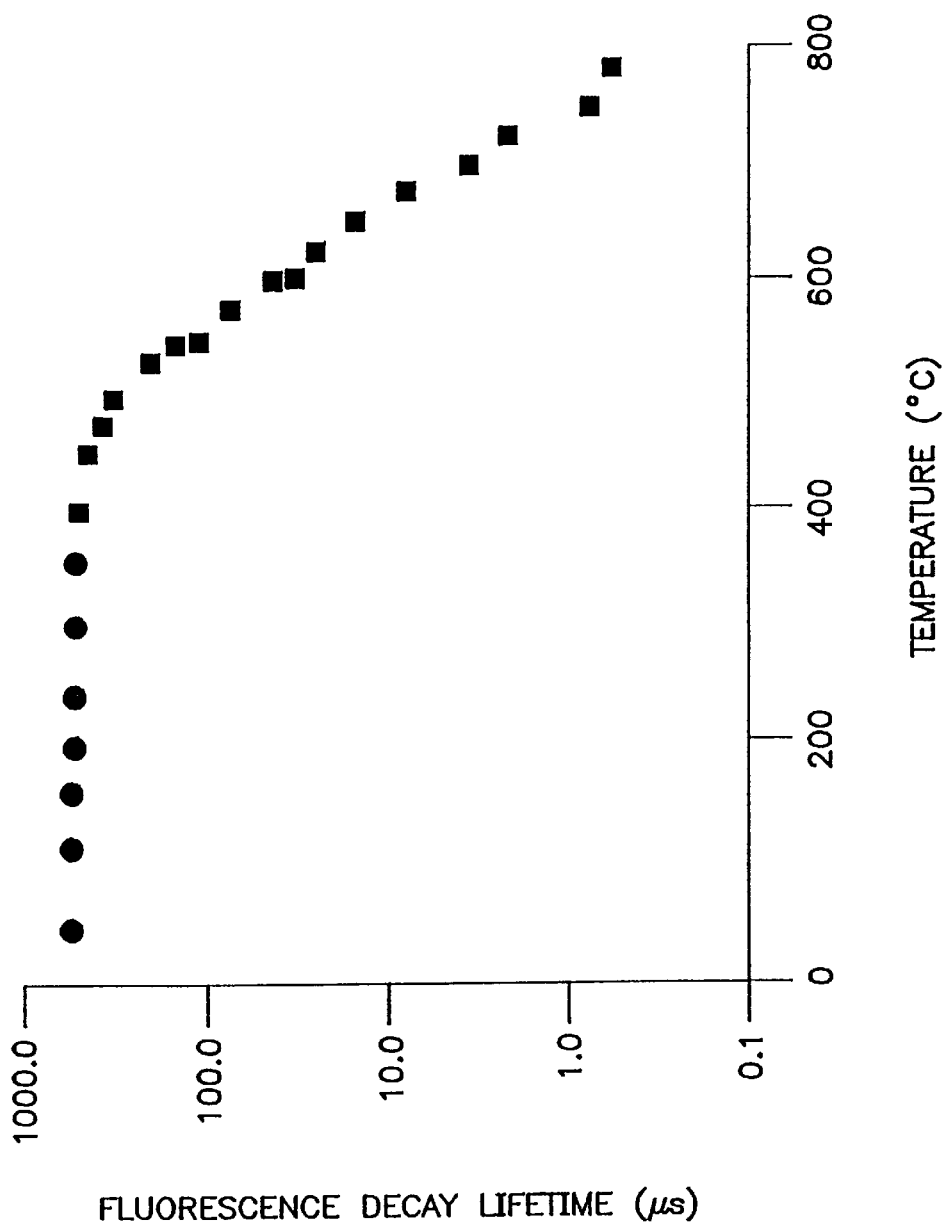
FIG. 2 is a graph showing decay time versus temperature for the phosphor $YVO_4$:Eu.

The phosphor sample 120 for a particular application should be selected according to the range of temperatures expected for that application, because the temperature-dependent characteristics for each fluorescing phosphor differ. For example, FIG. 2 shows a graph of decay time versus temperature for the phosphor $YVO_4$:Eu. As shown in FIG. 2, the decay time changes exponentially in the range of 400° C. to 800° C. This phosphor is a good choice for applications with expected temperatures in that range, since good accuracy in temperature measurement can be obtained even with relatively large errors in determining the decay time. The above-mentioned article by Noel, et al. shows curves for decay time vs. temperature of ten important thermographic (i.e., fluorescing) phosphors.

Referring again to FIG. 1, a photodetector 130 comprises, for example, a photomultiplier tube which detects the emitted light when phosphor sample 120 is fluorescing and converts the detected light into a corresponding electrical signal. The photodetector 130 may alternatively be a photodiode or other light detector. It should be selected to have good sensitivity in the range of wavelengths emitted by the particular phosphor used.

The electrical signal generated by the photodetector 130 is amplified by a preamplifier 140 and the amplified signal is differentiated by a differentiator 150. The differentiated electrical signal is input to a zero-crossing discrimination circuit 160. The zero-crossing discrimination circuit outputs a pulse signal that transitions from a first level to a second level (e.g., from zero to 5 volts) at the start of the excitation pulse from the light source 110. The pulse begins at the start of the excitation pulse, rather than at the start of fluorescence, because some of the light from the excitation pulse reflects from the target, i.e., the phosphor sample 120, and enters the photodetector 130. The phosphor sample 120 then begins fluorescing and the output pulse remains at the second level until the zero crossing of the differentiated electrical signal is discriminated.

The width of the pulse signal output by the zero-crossing detection circuit 160 corresponds to the time period between the start of the excitation pulse and the time when the value of the differentiated electrical signal reaches zero. Since the duration (a few nanoseconds) of the excitation pulse is small compared to the decay-time constant, the portion of the output pulse due to reflected light is negligible and the output pulse width substantially corresponds to the decay time. Alternatively, when a counter is used to measure the pulse width, the start of counting may be delayed to obtain an even more precise measure of the decay time.

The relationship between the output pulse width and the decay-time constant will be explained with reference to FIGS. 3(a) through 3(c).

Figure 3A:
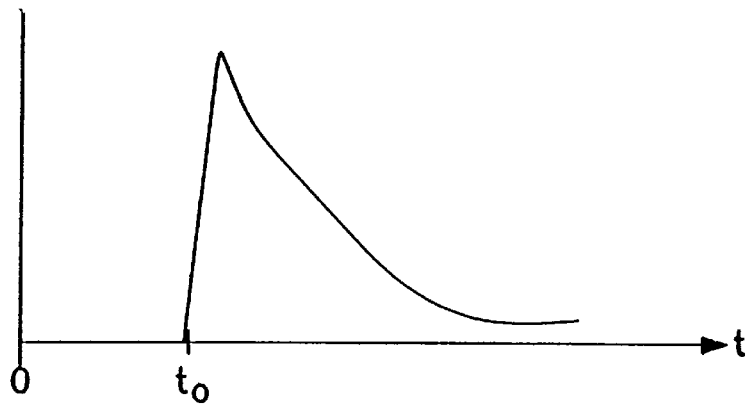
FIG. 3(a) is a waveform diagram showing the waveform shape of the electrical signal leaving the preamplifier 140.
Figure 3B:
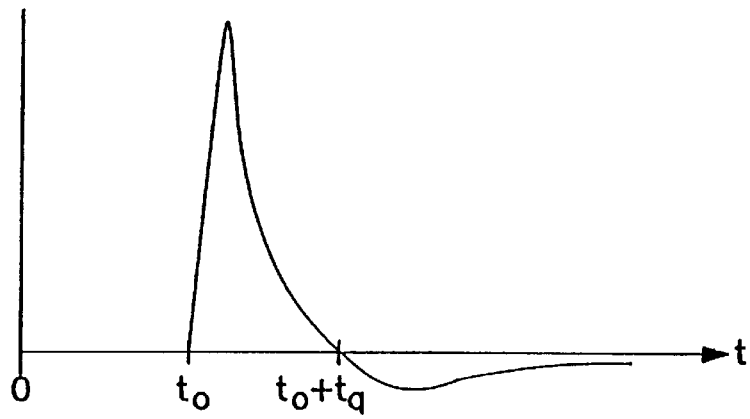
FIG. 3(b) is a waveform diagram showing the waveform shape of the electrical signal leaving the differentiator 150.
Figure 3C:
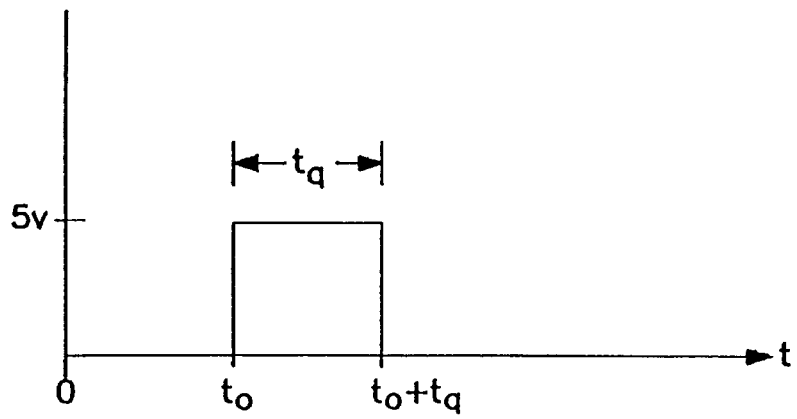
FIG. 3(c) is a waveform diagram showing the output pulse signal from the zero-crossing discrimination circuit 160.

FIG. 3(a) is a waveform diagram showing the waveform shape of the electrical signal leaving the preamplifier 140. The waveform has a near instantaneous rise time at time $t_0$ when the excitation pulse begins, followed by an exponential decay time. FIG. 3(b) is a waveform diagram showing the waveform shape of the electrical signal leaving the differentiator 150. This differentiated waveform also has an exponential decay time, but it passes through the zero axis at time $t_0+t_a$ and then rises again. FIG. 3(c) is a waveform diagram showing the output pulse signal from the zero-crossing discrimination circuit 160. The output pulse has a width $t_a$ corresponding to the time between when the excitation pulse occurs (i.e., when the photodetector begins receiving light) and when the zero-crossing is discriminated.

The zero-crossing discrimination circuit 160 described above will contain resistive and capacitive elements and, like any such network, will have a network time constant dependent on the values of its resistors and capacitors. This network time constant will be a fixed value, $\tau_1$. The decay time (and therefore the pulse width $t_a$) is proportional to a function of the phosphor decay-time constant and the network time constant $\tau_1$. If the phosphor decay-time constant is represented by $\tau_2$, then this relationship can be expressed as:

$$t_a = \frac{1}{(1/\tau_1 - 1/\tau_2)} \cdot \ln(\tau_1/\tau_2), \text{ for } \tau_1 \neq \tau_2; \text{ and}$$

$$t_a = 1/\tau_1, \text{ for } \tau_1 = \tau_2.$$

This relationship between the output pulse width and the decay-time constant is independent of the amplitude of the signals. Since the network time constant $\tau_1$ is fixed, upon measurement of the pulse width ta the decay-time constant $\tau_2$ can be calculated from the above relationship. For example, the output pulse signal of the zero-crossing discrimination circuit 160 of FIG. 1 can be used to enable/disable a counter. If the counter is clocked at a frequency of 1 KHz (i.e., 1000 clock pulses per second or one clock pulse per millisecond), the count value at the time the zero-crossing occurs will be a digital representation of the pulse width $t_a$ in milliseconds. That value can be used to calculate $\tau_2$ from the above relationship. Alternatively, the output pulse signal can be input into an integrator circuit which is calibrated using resistors and capacitors so that, for example, a pulse width $t_a$ of 100 ms gives a certain integrated voltage, such as 10 volts. In this manner, an analog representation of the pulse width is obtained.

Figure 4:
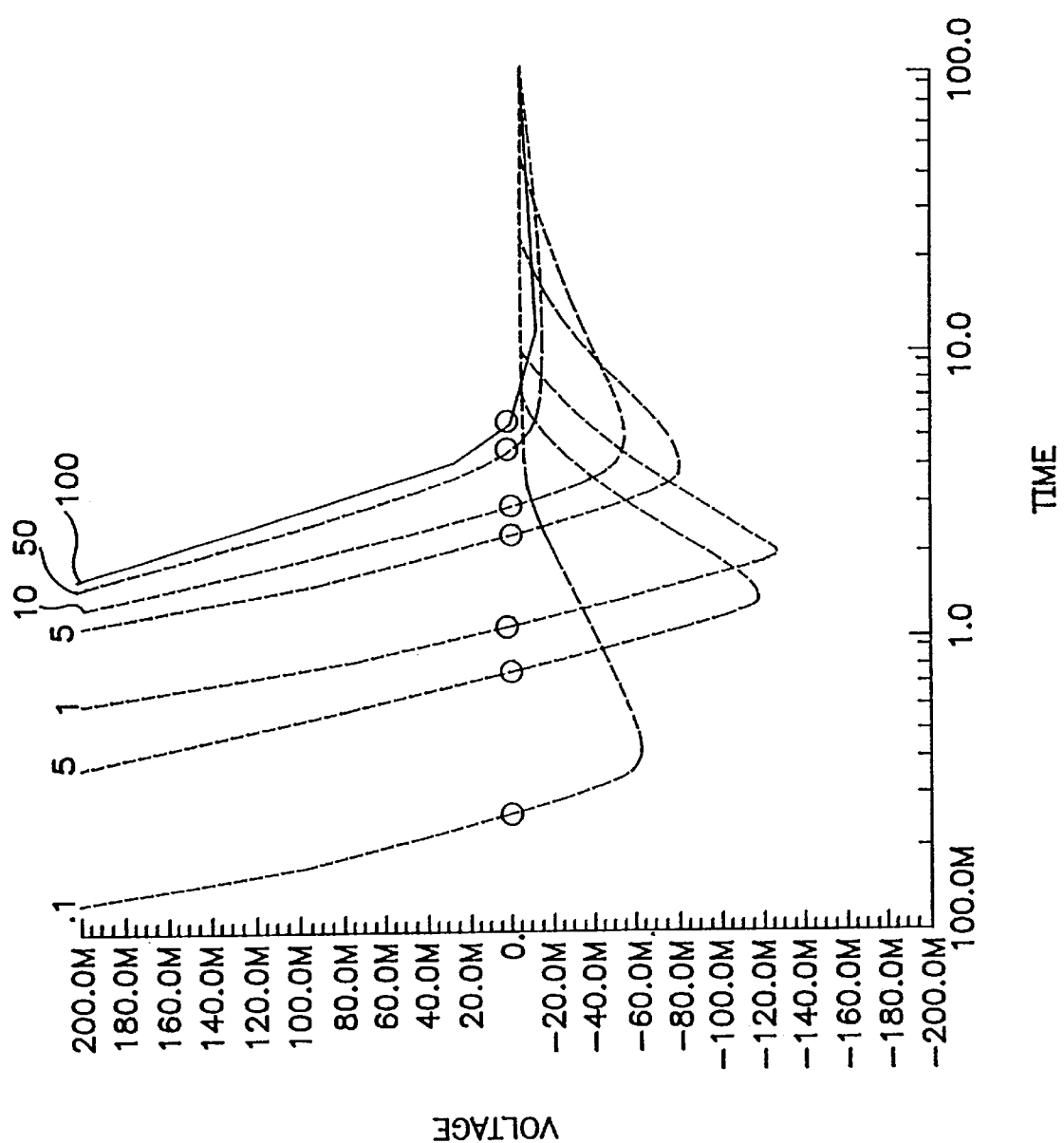
FIG. 4 is a graph showing decay curves for signals having various decay-time constants.

FIG. 4 is a graph of simulated differentiated waveforms having different decay-time constants. In the graph of FIG. 4, the network time constant $\tau_1$ is set to one time unit, and curves are shown for decay-time constants of 0.1, 0.5, 1, 5, 10, 50, and 100 time units. It can be seen that the curve corresponding to a decay-time constant of 1 time unit crosses the zero axis at one unit of time. By selecting the network time constant to be one time unit, the graph of FIG. 4 is scalable according to the selection of time units. In other words, if the network time constant is considered to be 1 μs, then the units of the x-axis are microseconds and the displayed curves are applicable to decay-time constants given in microseconds. If instead, for example, the network time constant is considered to be 1 ms, the decay-time constants are given in milliseconds and the units of the x-axis are milliseconds.

Figure 5:
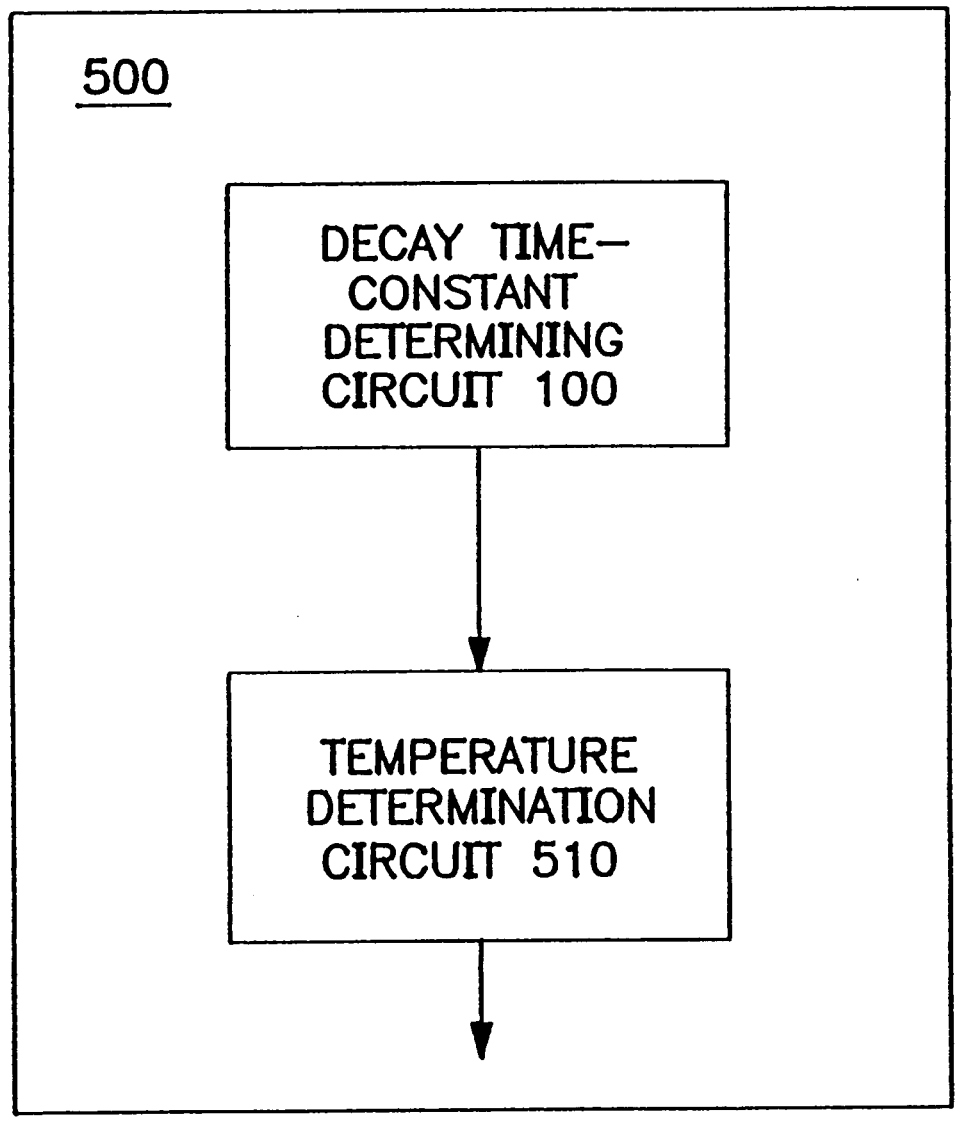
FIG. 5 is a block diagram of a temperature circuit incorporating a decay-time constant determining circuit according to the present invention.

According to another embodiment of the present invention, which is shown in FIG. 5, the circuit 100 for determining the decay-time constant is incorporated into a temperature circuit 500 for determining the temperature of the phosphor sample 120. As shown in FIG. 5, the temperature circuit 500 includes the decay-time constant determining circuit 100 and further includes a temperature determination circuit 510. The temperature determination circuit 510 receives the output pulse from the zero-crossing discrimination circuit 160 contained in the decay-time constant determining circuit 100. As discussed above, the width of that pulse is proportional to the decay-time constant of the phosphor. Based on the relationship between decay-time constant and temperature for the particular phosphor used, the temperature determination circuit 510 outputs a signal indicating the temperature of the phosphor sample 120.

Figure 6A:
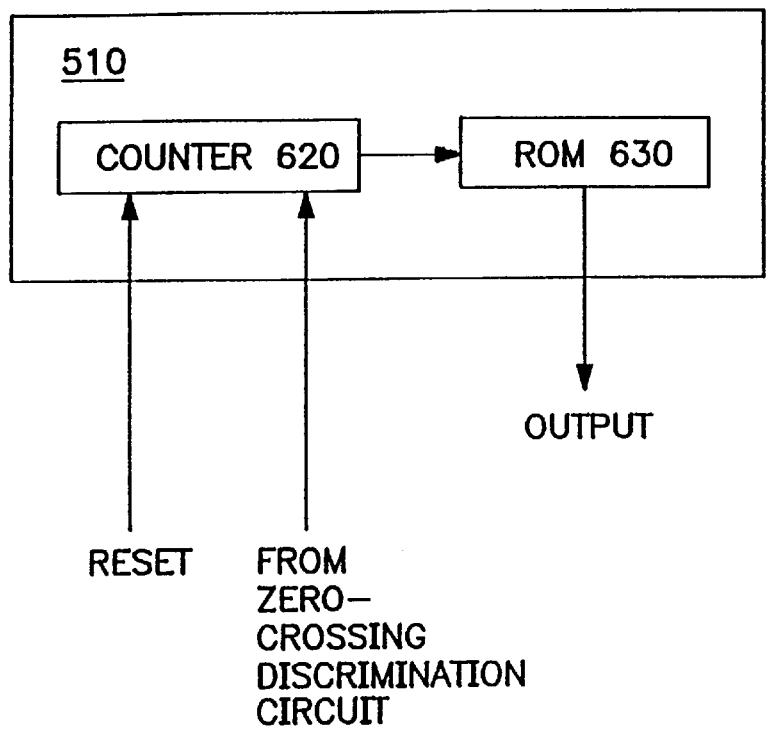
FIG. 6(a) is a block diagram showing one preferred embodiment of a temperature determination circuit forming part of the temperature circuit shown in FIG. 5.

FIG. 6(a) shows one particular embodiment of the temperature determination circuit 510. A counter 620 is provided which begins counting when the output pulse from the zero-crossing discrimination circuit 160 changes from zero to a high signal level and stops counting when the pulse returns to zero. A control signal for resetting the counter 620 is output to the counter before the phosphor sample is irradiated with an excitation pulse. This signal may be generated, for example, by the control electronics for controlling the light source 110. The value stored in the counter 620 when it stops counting corresponds to the pulse width and accordingly is proportional to the decay-time constant. The counter value is input into a ROM 630 which stores data for a look-up table (LUT) relating decay-time constants (or the corresponding pulse widths) to temperatures for a given phosphor. The counter value representing a particular decay-time constant addresses a location in the ROM 630 which contains temperature data corresponding to that decay-time constant. The temperature data is output by the ROM 630, thereby providing a digital indication of the temperature of the phosphor.

Since each fluorescing phosphor has different temperature-dependent characteristics, the look-up table in the ROM 630 must be calibrated for use with a particular phosphor. One method of calibration is to gradually heat a phosphor sample and measure the decay-time constant at periodic temperature intervals. This will generate data like that plotted in the graph of FIG. 2 for YVO$_4$:Eu. The data is then stored in the look-up table so that when a particular decay-time constant is later detected, the corresponding temperature can be output.

Figure 6B:
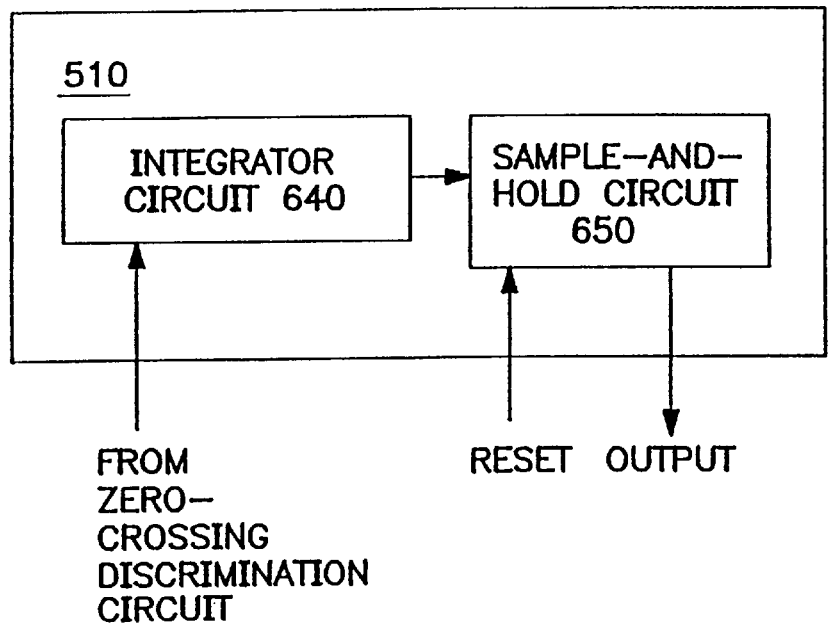
FIG. 6(b) is a block diagram showing another preferred embodiment of a temperature determination circuit forming part of the temperature circuit shown in FIG. 5.

FIG. 6(b) shows another embodiment of the temperature determination circuit 510. In this embodiment, the output pulse from the zero-crossing discrimination circuit is input to an integrator circuit 640. The output signal from the integrator circuit 640 is latched by a sample-and-hold circuit 650. As with the counter 620 of FIG. 6(a), a control signal for resetting the sample-and-hold circuit 650 is output to the sample-and-hold circuit before the phosphor sample is irradiated with an excitation pulse. Accordingly, the output level of the integrator circuit 640 that is latched by the sample-and-hold circuit 650 will correspond to the pulse width and therefore will also be indicative of the temperature. By collecting in advance experimental data that relates the integrator output level to temperature, the integrator output level obtained for a decay-time constant measurement can be correlated to a corresponding temperature.

Of course, either a counter output value or an integrator output level can be input into a computer (broadly meaning a personal computer, microprocessor or other such signal processing means) for processing the signal and displaying a corresponding temperature. For example, a counter value corresponding to a pulse width $t_a$ can be input to a computer that then calculates the decay-time constant $\tau_2$ and compares it to stored data to output a corresponding temperature. Alternatively, the computer may store data directly relating the pulse width $t_a$ to temperature. As a further alternative, as will be explained below, the output pulse signal of the zero-crossing discriminator circuit 160 can be input to a computer so that the computer can perform both the functions of counting and conversion of the count value to a temperature value.

Figure 7A:
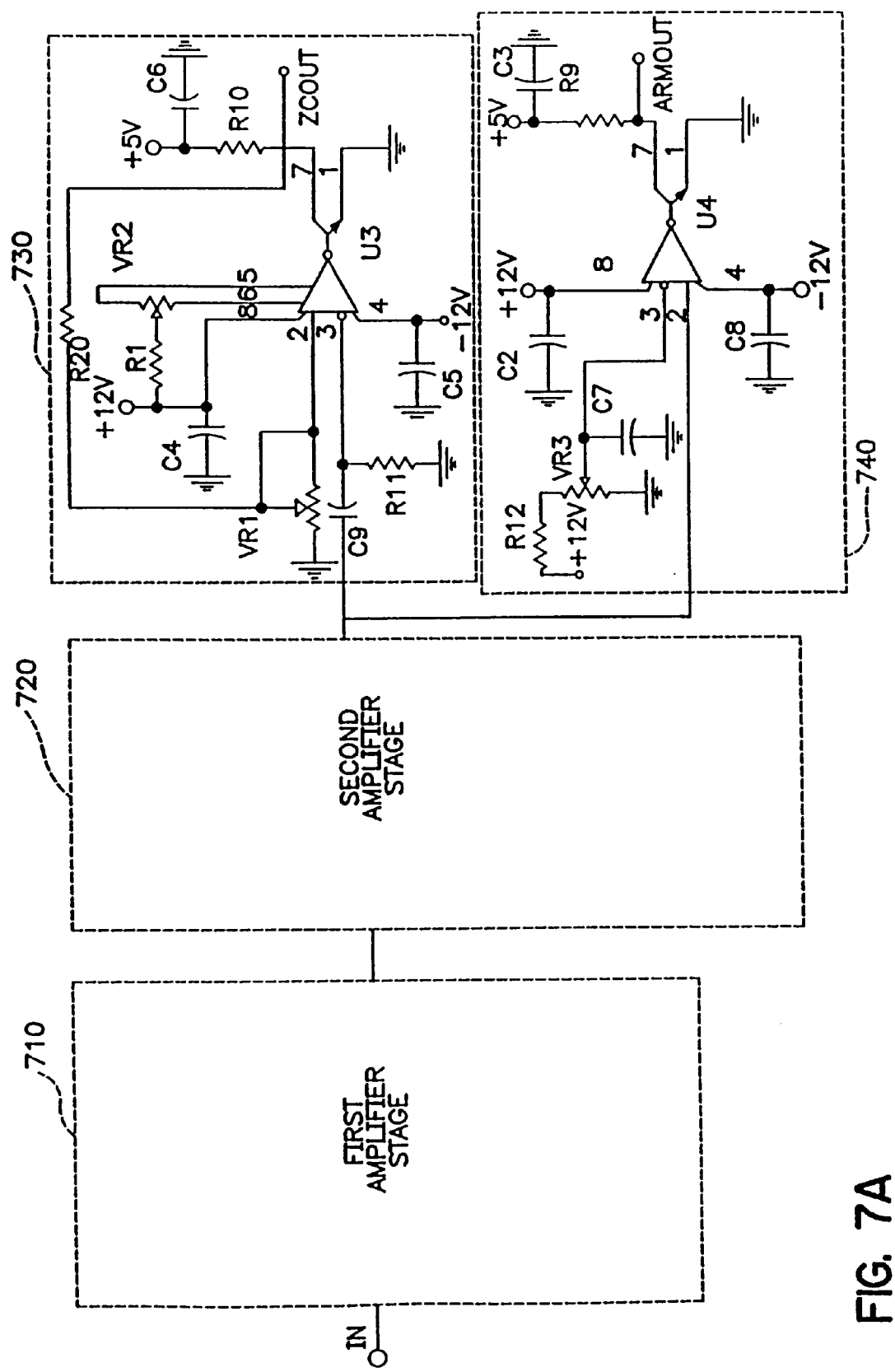
FIG. 7(a) is a schematic of a circuit for outputting a pulse having a width proportional to the decay-time constant of a phosphor.
Figure 7B:
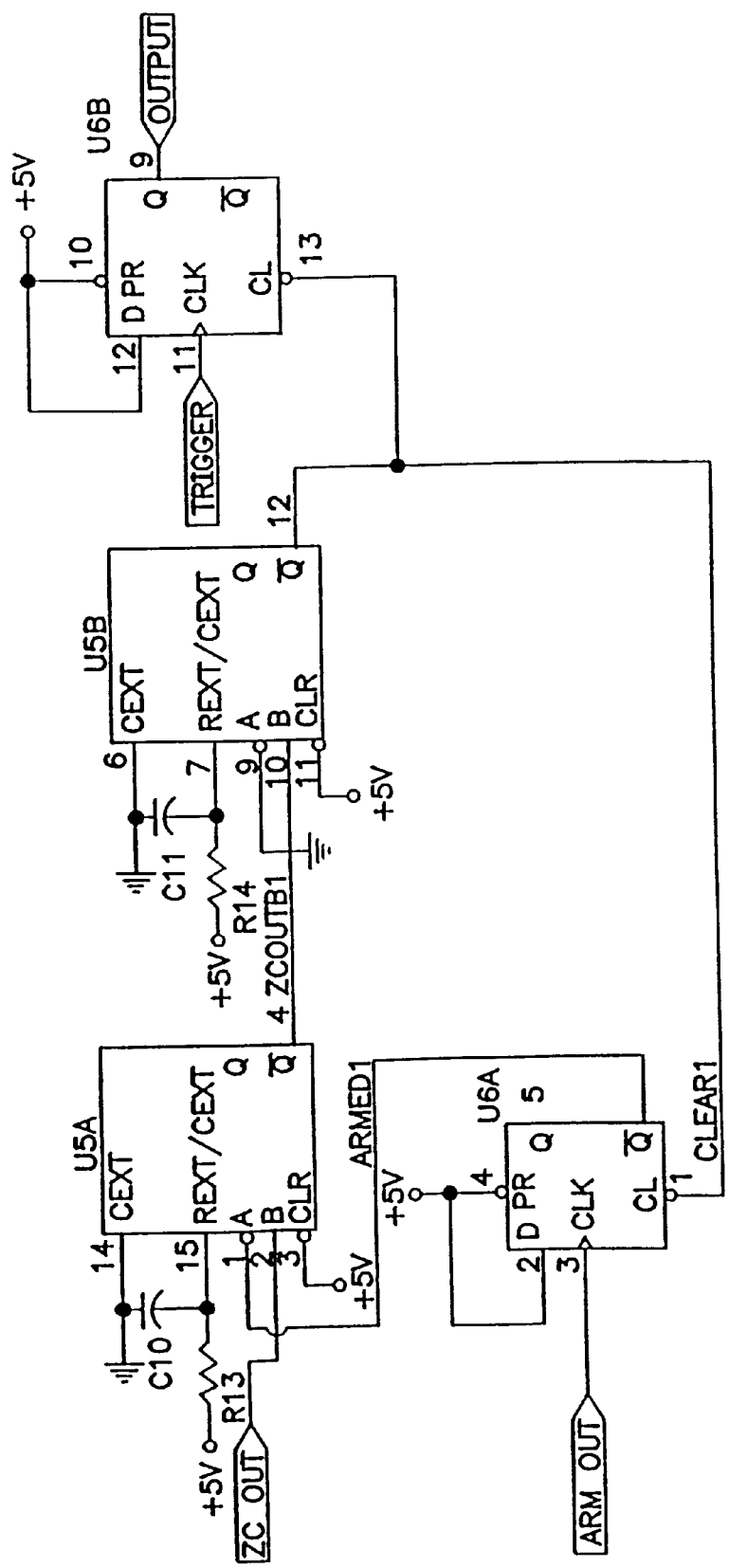
FIG. 7(b) is a schematic of a circuit for providing a suitable signal to a personal-computer-based counter when an output pulse is generated by the circuit of FIG. 7(a) in response to irradiation of a phosphor by an excitation pulse.

A specific implementation of the invention will be described with respect to the schematic diagrams shown in FIGS. 7(a) and 7(b). The numbers adjacent to signal lines entering/leaving a device in FIGS. 7(a) and 7(b) correspond to the pin numbers of the integrated circuit chip used for that device in this implementation. As shown in FIG. 7(a), a two-stage amplifier is used that includes a first amplifier stage 710 having a gain of approximately 100 and a second amplifier stage 720 having a gain of approximately 20. Of course, the invention is not limited to a particular number of amplifier stages or a particular type of amplifier. Further, those of ordinary skill will appreciate that conventional RC blocking circuits may be included to block any DC component present in the input signal or before the second amplifier stage.

The output of the second amplifier stage 720 is input to a zero-crossing discriminator 730. The zero-crossing discriminator comprises a comparator U3, which may be an LM311 chip, for example. The input signal is connected to pin 3 of the comparator U3 through an RC circuit comprising capacitor C9 and resistor R11. These two components (C9 and R11) are the dominant components in determining the network time constant $\tau_1$ for this embodiment, and values were selected so that their product provided a time constant of approximately 200 μs. The comparator U3 is connected to a 12 volt power supply through an RC circuit comprising capacitor C4 (0.01 μF) and resistor R1 (3K ohms), which is connected to variable resistor VR2 (5K ohm potentiometer). Variable resistor VR2 is also connected to pins 5 and 6, as shown in FIG. 7(*a*). Pin 4 of the comparator U3 is connected to a −12 volt power supply and to a capacitor C5 (0.01 μF). The comparator U3 has an open collector output. Pin 1 is grounded and pin 7 is pulled up to a 5 volt level through an RC circuit comprising capacitor C6 (0.1 μF) and resistor R10 (1K ohms). A feedback resistor R20 (10K ohms) and a variable resistor VR1 (100 ohm potentiometer) are connected between pin 7 and pin 2. The potentiometers can be adjusted to compensate for variations in other components and to obtain the best performance for a particular circuit implementation.

The output of the zero-crossing discriminator 730 is a pulse signal ZCOUT which, in this configuration, is a negative pulse. The width of the output pulse corresponds to the decay-time constant, as well as to the temperature of the irradiated phosphor, and as discussed above this pulse can be input into an integrator, used to gate a counter, or input into a computer or other processing means.

The circuit of FIGS. 7(*a*) and 7(*b*) also includes an arming discriminator circuit 740. This circuit improves performance by indicating which signals output from the zero-crossing discriminator 730 are due to noise. As shown in FIG. 7(*a*), the arming discriminator circuit 740 comprises a comparator U4 which, like comparator U3, may be an LM311 chip. The output of the second amplifier stage 720 is input at pin 2 of comparator U4. Pin 8 of the comparator U4 is connected to a 12 volt power supply and to a capacitor C2 (0.01 μF) and pin 4 is connected to a −12 volt power supply and to a capacitor C8 (0.01 μF). Pin 3 (with its input inverted) is connected to a 12 volt power supply through an RC circuit comprising capacitor C7 (0.1 μF), variable resistor VR3 (1K ohm potentiometer), and resistor R12 (10K ohms). Pin 1 is connected to ground and pin 7 is pulled up to a 5 volt level via an RC circuit comprising capacitor C3 (0.1 μF) and resistor R9 (1K ohms).

By changing the resistance of variable resistor VR3, a threshold level can be set for the comparator U4. If a signal below the threshold is detected (e.g., due to input noise), the output of the arming discriminator circuit 740 will not change. However, such noise signals will generate output pulses from the zero-crossing discriminator 730. The arming discriminator circuit 740 provides a signal for distinguishing which output signals from the zero-crossing discriminator 730 are responsive to an excitation pulse and which output signals are due to noise, so that the latter signals can be ignored. When a signal above the threshold level (which indicates that the signal is not mere noise) is detected by the arming discriminator circuit 740, the output signal ARMOUT transitions to a different level (e.g., from zero to 5 volts), thereby indicating that the output of the zero-crossing discriminator circuit 730 is a valid signal (i.e., a signal due to irradiation of the phosphor).

In the circuit of FIGS. 7(*a*) and 7(*b*), the ARMOUT signal is used together with the output pulse signal ZCOUT from the zero-crossing discriminator to generate a signal suitable for input and use by a personal-computer-based (PC-based) counter (i.e., the signal is a 5 volt signal that is compatible with most digital logic circuits). This is explained with reference to FIG. 7(*b*).

As shown in FIG. 7(*b*), a flip-flop U6B receives at its clock input a signal called TRIGGER. The TRIGGER signal is generated when the excitation pulse is output from the light source; for example, it is generated by the control electronics for pulsing a laser. The output signal of flip-flop U6B (OUTPUT) then goes high (i.e., to 5 volts) and is input to a PC-based counter. The duration of the high-level output signal from flip-flop U6b is controlled as follows.

The signal ZCOUT generated by the zero-crossing discriminator 730 is input to pin 2 of a one-shot multivibrator U5A, which may be a 74HC221 chip, for example. The multivibrator U5A is connected to a 5 volt power supply via an RC circuit comprising capacitor C10 and resistor R13. The values of C10 and R13 are selected so that their product gives a time constant much less than the expected time to the zero-crossing. The clear input is connected to a 5 volt power supply. The ZCOUT signal will have no effect on the multivibrator U5A until the multivibrator is armed. Arming occurs when the arming discriminator circuit 740 detects a signal above the set threshold level and outputs a pulse as the ARMOUT signal. The ARMOUT signal clocks a flip-flop U6A, which may be a 74HC74 chip, for example. The inverted output (Q-bar) of the flip-flop U6A is a signal ARMED1, which is input to pin 1 of multivibrator U5A. Once the multivibrator U5A is armed, a rising edge of the pulse signal ZCOUT from the zero-crossing discriminator 730 will trigger the multivibrator U5A to output a pulse ZCOUTB1. That pulse is input to a second multivibrator U5B that is similarly connected to a 5 volt power supply. The second multivibrator U5B outputs a pulse in response to the pulse ZCOUTB1. That output pulse clears the flip-flop U6A so that the first multivibrator U5A is no longer armed. The same output pulse also clears the flip-flop U6B, causing the flip-flop OUTPUT signal to return to zero. Thus, the output signal from flip-flop U6b is high for the period between when the excitation pulse is started and when the zero-crossing is detected.

A circuit based on the design shown in FIGS. 7(*a*) and 7(*b*) was constructed and tested by inputting waveforms having known decay-time constants and measuring the zero-crossing times. For a network time constant of 200 μs, the measured data shown in Table 1 was obtained (for i=0 to 6, where $T_i$ is the zero-crossing time in μs and $tau_i$ is the decay-time constant in μs):

TABLE 1

| i | $tau_i$ | $T_i$ |
|---|---|---|
| 0 | 10 | 38 |
| 1 | 50 | 98 |
| 2 | 100 | 140 |
| 3 | 150 | 170 |

TABLE 1-continued

| i | $tau_i$ | $T_i$ |
|---|---------|-------|
| 4 | 200     | 201   |
| 5 | 300     | 242   |
| 6 | 400     | 285   |

A simulation was also performed, using a network time constant normalized to 1 time unit. The values shown in Table 2 were obtained (for i=0 to 6, where $cross_i$ is the zero-crossing time and $tau2_i$ is the decay-time constant):

TABLE 2

| i | $tau2_i$ | $cross_i$ |
|---|----------|-----------|
| 0 | .1       | .249      |
| 1 | .5       | .691      |
| 2 | 1        | 1         |
| 3 | 1.5      | 1.21      |
| 4 | 2        | 1.39      |
| 5 | 50       | 4         |
| 6 | 100      | 4.5       |

Figure 8:
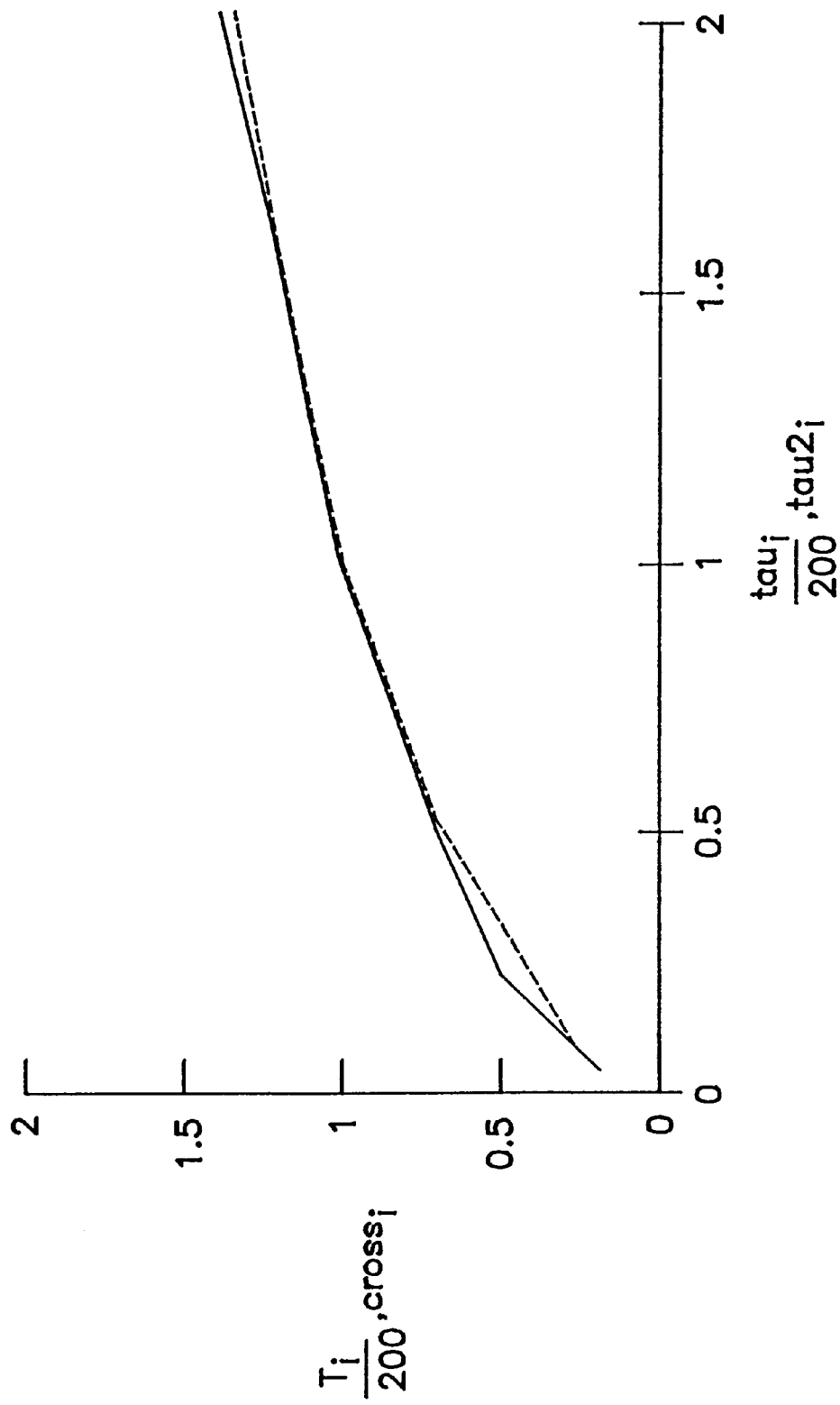
FIG. 8 is a graph comparing simulated data to measured data obtained from a circuit constructed based on the schematic of FIG. 7(a).

FIG. 8 is a graph comparing the measured and simulated data. The dashed line in FIG. 8 represents a plot of the simulated data. The solid line represents a plot of the measured data values divided by 200 (to scale them to a network time constant of 1 $\mu s$ for a better comparison to the simulated data). The similarity of the curves illustrates the excellent results obtained by the method and apparatus of the present invention.

The above-described embodiments are not limited to measuring the temperature of phosphor sample 120 itself, but may also be used to measure (at least approximately) the surface temperature of an object on which the phosphor sample 120 is deposited. For example, the phosphor sample 120 may be deposited on a piece of metal, such as aluminum or steel. The temperature of the phosphor sample 120 will become approximately the same as that of the metal, due to thermal conductivity. Therefore, the temperature signal output by the temperature circuit 500 will indicate the temperature of the metal as well as that of the phosphor sample 120. Accordingly, this circuit may be useful for obtaining real-time measurements of metal temperatures in an aluminum or steel manufacturing process. These real-time measurements may be used for analysis and manual adjustment of process variables or even for feedback control of the process.

More specifically, the present invention can be applied to a method and apparatus for controlling the temperature at which an intermediate steel product (or other metal product) is presented at a predetermined stage in a multi-step process of manufacturing a final steel product (or other metal product), in which one or more process variables can be adjusted in order to alter the temperature at which said intermediate steel product is presented at said predetermined stage. An example of such a process is a process for making galvannealed steel. Galvannealing involves passing a steel strip through a zinc coating pot to form a zinc coating on the steel. A steel strip exiting the zinc coating pot passes through an annealing furnace which promotes the diffusion of iron from the steel into the zinc coating. During this stage of the process, up to four metallurgical phases (i.e., layers) form, each containing increasing amounts of zinc towards the surface. To control the final microstructure, which defines the end product quality, precise control over the time-temperature relationship is crucial.

In order to control this time-temperature relationship and ensure a high quality final product, the temperature of the product, as well as line speed, furnace power, and other process dynamics, must be controlled interactively during the galvannealing process. To aid in this control, it is desirable to monitor the temperature of the product at various stages. In particular, it is desirable to monitor the product's temperature as it exits the zinc pot, to maintain the ideal temperature of the product at the annealing stage.

Figure 9:
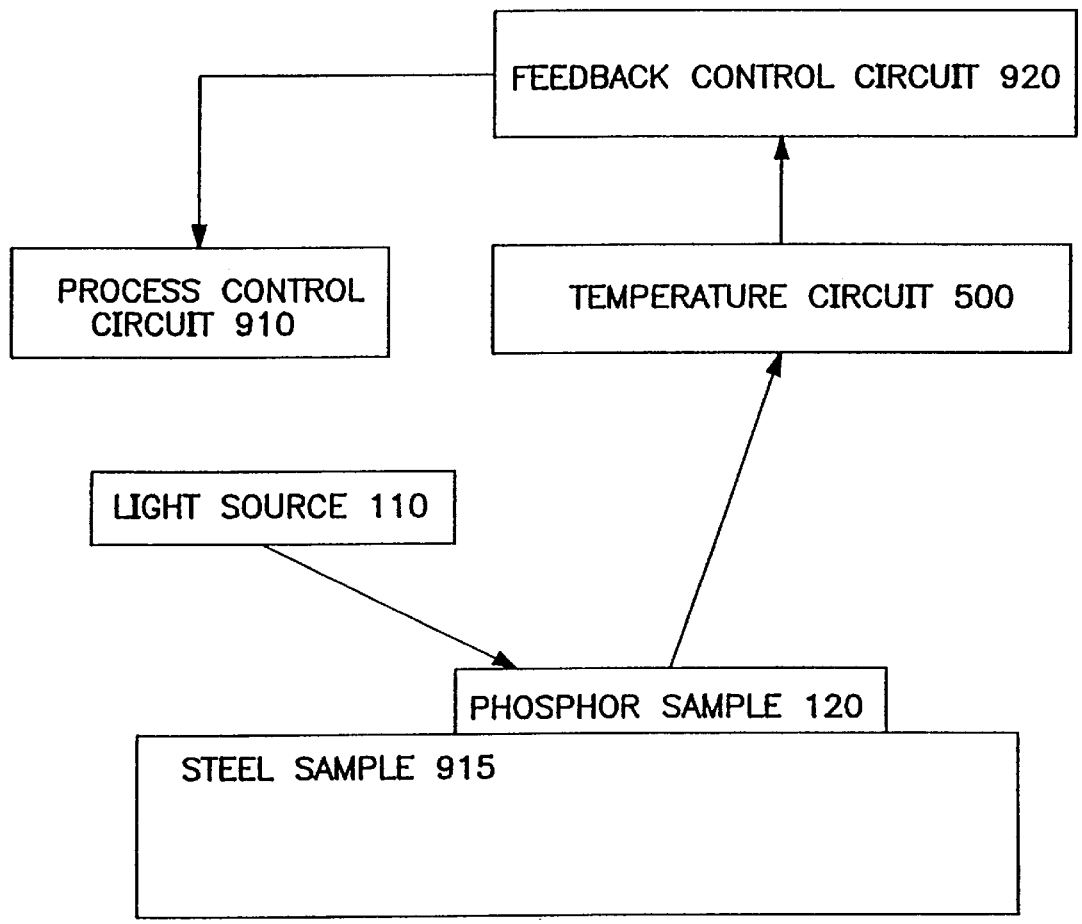
FIG. 9 is a block diagram showing an apparatus for controlling a steelmaking process using the temperature circuit of FIG. 5.

FIG. 9 shows an arrangement in which the present invention is applied to control a steelmaking process in the manner discussed above. A process control circuit 910 controls one or more process variables of the steelmaking process, such as furnace power or line speed, for example. Temperature circuit 500 determines the surface temperature of an intermediate product, i.e., steel sample 915, when it exits the zinc pot, by determining the temperature of a phosphor sample 120 deposited on the steel sample 915. Temperature circuit 500 outputs a signal indicating the determined temperature. A feedback control circuit 920 receives the temperature signal from the temperature circuit 500 and, if necessary, outputs an adjustment signal to the process control circuit 910 to adjust at least one of the process variables. For example, the feedback control circuit 920 may check the temperature signal it receives from the temperature circuit 500 to determine if the temperature of the metal is within a predetermined range. If the temperature is outside of that range, the feedback control circuit 920 outputs an appropriate adjustment signal to cause the process control circuit 910 to increase or decrease the furnace temperature, as needed.

The process control circuit 910 can be any conventional control circuit for controlling process variables in a steelmaking process. The only requirement is that the control circuit be constructed or adapted to respond automatically to an adjustment signal to change process variables. For example, a conventional control circuit which receives computer signals to set process variables at a desired level is ideally suited for use in the arrangement of FIG. 9. Depending on the structure of the process control circuit 910, the adjustment signal output by the feedback control circuit 920 may be, for example, either a digital signal that indicates a magnitude and direction (i.e., increase or decrease) of a change in a process parameter, or an analog signal, such as a voltage level indicating the same information.

The present invention, as described above, provides a simple and relatively inexpensive method and apparatus for making real-time measurements of the decay-time constant and/or temperature of a fluorescing phosphor.

Although the present invention has been described with respect to specific embodiments thereof, it is not limited to such specific embodiments. For example, the signal lines shown in the block diagrams are for the purpose of illustrating the flow of data and need not correspond to physical data lines. In other words, the functions described for separate blocks depicted in the block diagrams may be combined within a single computer or other device. Those skilled in the art readily will appreciate numerous equivalent embodiments and modifications of the present invention, including alternative structures and elements, without departing from the spirit of the invention, which is defined in the following claims.

What is claimed is:

1. An apparatus for determining the temperature of a phosphor that fluoresces when irradiated by light and that has a fluorescent decay-time constant dependent on temperature, said apparatus comprising:

a photodetector that detects light emitted by the phosphor and outputs an electrical signal proportional to the detected light;

a differentiator which differentiates the electrical signal;

a zero-crossing discrimination circuit which discriminates the zero-crossing of the differentiated electrical signal and outputs a signal indicating the zero-crossing; and determining means for determining the temperature of the phosphor based on the discriminated zero-crossing.

2. An apparatus according to claim 1, wherein said determining means comprises means for integrating the signal output by the zero-crossing discrimination circuit and outputting a signal proportional to the temperature of the phosphor.

3. An apparatus according to claim 1, wherein said determining means comprises counting means for performing counting in accordance with the signal output by the zero-crossing discrimination circuit and for outputting a count value proportional to the temperature of the phosphor.

4. An apparatus according to claim 3, wherein said determining means further comprises memory means for receiving the count value output by said counting means and for outputting a stored temperature value corresponding to the received count value.

5. An apparatus according to claim 1, further comprising a light source for irradiating the phosphor.

6. A method for determining the temperature of a phosphor that fluoresces when irradiated by light and that has a fluorescent decay-time constant dependent on temperature, said method comprising the steps of:

irradiating the phosphor with an excitation pulse;

detecting light emitted by the phosphor in response to irradiation with the excitation pulse;

converting the detected light to an electrical signal;

determining the decay-time constant of the phosphor by
(i) differentiating the electrical signal;
(ii) discriminating the zero-crossing point of the differentiated electrical signal; and
(iii) outputting a pulse signal having a pulse width corresponding to the time period between the start of the excitation pulse and the time when the differentiated electrical signal reaches zero, wherein the pulse width is proportional to the decay-time constant of the phosphor; and determining the temperature of the phosphor based on the decay-time constant.

7. An apparatus for determining the surface temperature of a piece of metal, on which there is deposited a phosphor that fluoresces when irradiated with an excitation pulse of light and that has a fluorescent decay-time constant dependent on temperature, said apparatus comprising:

a photodetector that detects light emitted by the phosphor and outputs an electrical signal proportional to the detected light;

a pre-amplifier that amplifies the electrical signal;

a differentiating circuit which differentiates the amplified electrical signal;

a zero-crossing discrimination circuit which receives the differentiated electrical signal and in response outputs a pulse signal, the width of the pulse signal corresponding to the time period between the start of the excitation pulse and the time when the differentiated electrical signal reaches zero;

a counter which receives the pulse signal and outputs a count value corresponding to the pulse width; and a memory device that stores data regarding pulse width values and corresponding temperature values, said memory device receiving the count value output by said counter and in response outputting the corresponding temperature value.

8. A method for determining the surface temperature of a piece of metal on which there is deposited a phosphor that fluoresces when irradiated by light and that has a fluorescent decay-time constant dependent on temperature, said method comprising the steps of:

irradiating the phosphor with an excitation pulse;

detecting light emitted by the phosphor in response to irradiation with the excitation pulse;

converting the detected light to an electrical signal;

amplifying the electrical signal;

differentiating the amplified electrical signal;

discriminating the zero-crossing point of the differentiated electrical signal;

outputting a pulse signal having a pulse width corresponding to the time period between the start of the excitation pulse and the time when the differentiated electrical signal reaches zero, wherein the pulse width is proportional to the decay-time constant of the phosphor;

generating a count value corresponding to the pulse width; and retrieving a temperature value corresponding to the count value from a memory device that stores data relating pulse width values to corresponding temperature values.

9. A method of controlling the temperature at which an intermediate steel product is presented at a predetermined stage in a multi-step process of manufacturing a final steel product, in which one or more process variables can be adjusted in order to alter the temperature at which said intermediate steel product is presented at said predetermined stage, said method comprising the steps of:

irradiating a fluorescing phosphor deposited on a piece of metal with an excitation pulse;

detecting light emitted by the phosphor in response to the excitation pulse;

converting the detected light into an electrical signal;

differentiating the electrical signal;

discriminating the zero-crossing point of the differentiated electrical signal;

generating a signal indicating the zero-crossing point;

determining the temperature of the phosphor based on the signal indicating the zero-crossing point;

adjusting at least one of said process variables in accordance with the determined temperature of the phosphor.

10. A method according to claim 9, wherein said generating step comprises generating a pulse signal having a pulse width corresponding to the period of time between the start of the excitation pulse and when the zero-crossing point is discriminated, and said determining step comprises determining the decay-time constant of the phosphor based on the pulse width and determining the temperature of the phosphor based on the decay-time constant of the phosphor.

11. A method according to claim 9, wherein the multi-step process is a process for galvannealing including passing a steel strip through a zinc pot and then passing the steel strip through an annealing furnace, wherein said irradiating step comprises irradiating the phosphor when the steel strip exits the zinc pot and said adjusting step comprises adjusting at least the furnace power.

12. An apparatus for controlling the temperature at which an intermediate steel product is presented at a predetermined stage in a multi-step process of manufacturing a final steel product, in which one or more process variables can be adjusted in order to alter the temperature at which said intermediate steel product is presented at said predetermined stage, said apparatus comprising:

a process control unit for controlling at least one of the process variables;

a temperature circuit for determining the temperature of a phosphor deposited on a piece of steel by detecting light emitted by the phosphor in response to irradiation of the phosphor with an excitation pulse of light, said temperature circuit comprising means for converting the detected light into an electrical signal, means for differentiating the electrical signal, discriminating means for discriminating the zero-crossing point of the differentiated electrical signal and for generating a signal indicating the zero-crossing point, and determining means for determining the temperature of the phosphor based on the signal indicating the zero-crossing point; and adjusting means for generating an adjustment signal based on the determined temperature of the phosphor and for transferring the adjustment signal to said process control unit to adjust at least one process variable.

13. An apparatus according to claim 12, wherein said means for discriminating generates a pulse signal having a pulse width corresponding to the period of time between the start of the excitation pulse and when the zero-crossing point is discriminated, and said determining means comprises means for determining the decay-time constant of the phosphor based on the pulse width and for determining the temperature of the phosphor based on the decay-time constant of the phosphor.

14. An apparatus according to claim 12, wherein said adjusting means comprises means for comparing the determined temperature of the phosphor to a predetermined temperature range and for generating the adjustment signal based on the results of the comparison.

15. An apparatus according to claim 12, wherein the multi-step process is a process for galvannealing involving passing a steel strip through a zinc pot and then passing the steel strip through an annealing furnace, wherein said temperature is located to detect light emitted by the phosphor in response to irradiation of the phosphor when the steel strip exits the zinc pot, and said adjusting means comprises means for generating an adjustment signal to adjust at least the furnace power.

* * * * *